T. S. COURTNEY.
FEED WHEEL FOR CORN SHELLERS.
APPLICATION FILED FEB. 27, 1917.

1,362,679.

Patented Dec. 21, 1920.
2 SHEETS—SHEET 1.

Witness:
Leonard S. Burns.

Inventor:
Thomas S. Courtney
by W. C. Jirdinston
his Attorney.

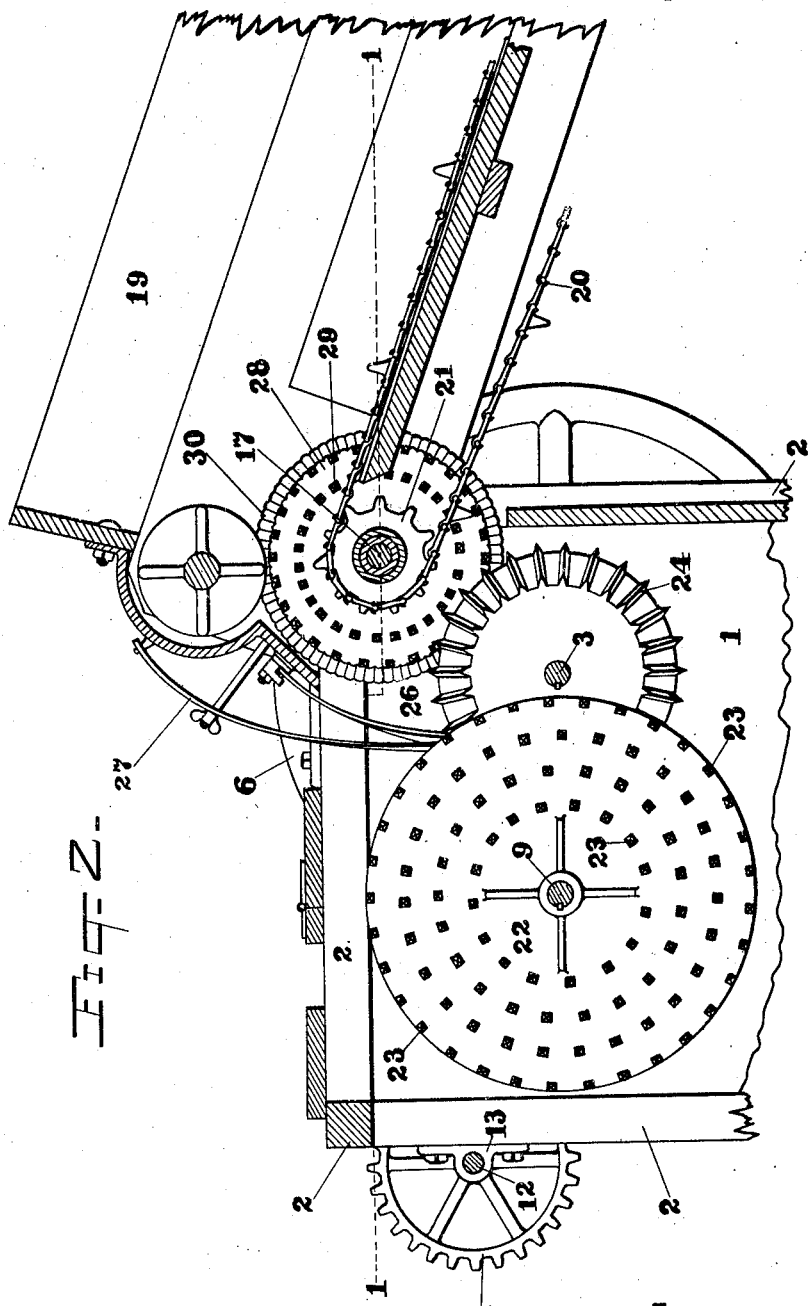

UNITED STATES PATENT OFFICE.

THOMAS S. COURTNEY, OF EAST MOLINE, ILLINOIS, ASSIGNOR TO DEERE AND COMPANY, OF MOLINE, ILLINOIS, A CORPORATION OF ILLINOIS.

FEED-WHEEL FOR CORN-SHELLERS.

1,362,679.

Specification of Letters Patent.

Patented Dec. 21, 1920.

Application filed February 27, 1917. Serial No. 151,261.

*To all whom it may concern:*

Be it known that I, THOMAS S. COURTNEY, a citizen of the United States, residing at East Moline, in the county of Rock Island and State of Illinois, have invented certain new and useful Improvements in Feed-Wheels for Corn-Shellers, of which the following is a specification, reference being had therein to the accompanying drawing.

My invention relates to certain new and useful improvements in corn-shellers, and has for its object to perfect the mechanism by which the corn is fed to the shelling wheel.

Referring to the drawings in which similar letters indicate identical parts—

Fig. 2 is a longitudinal vertical section on the line 2—2 of Fig. 1.

Figure 1:
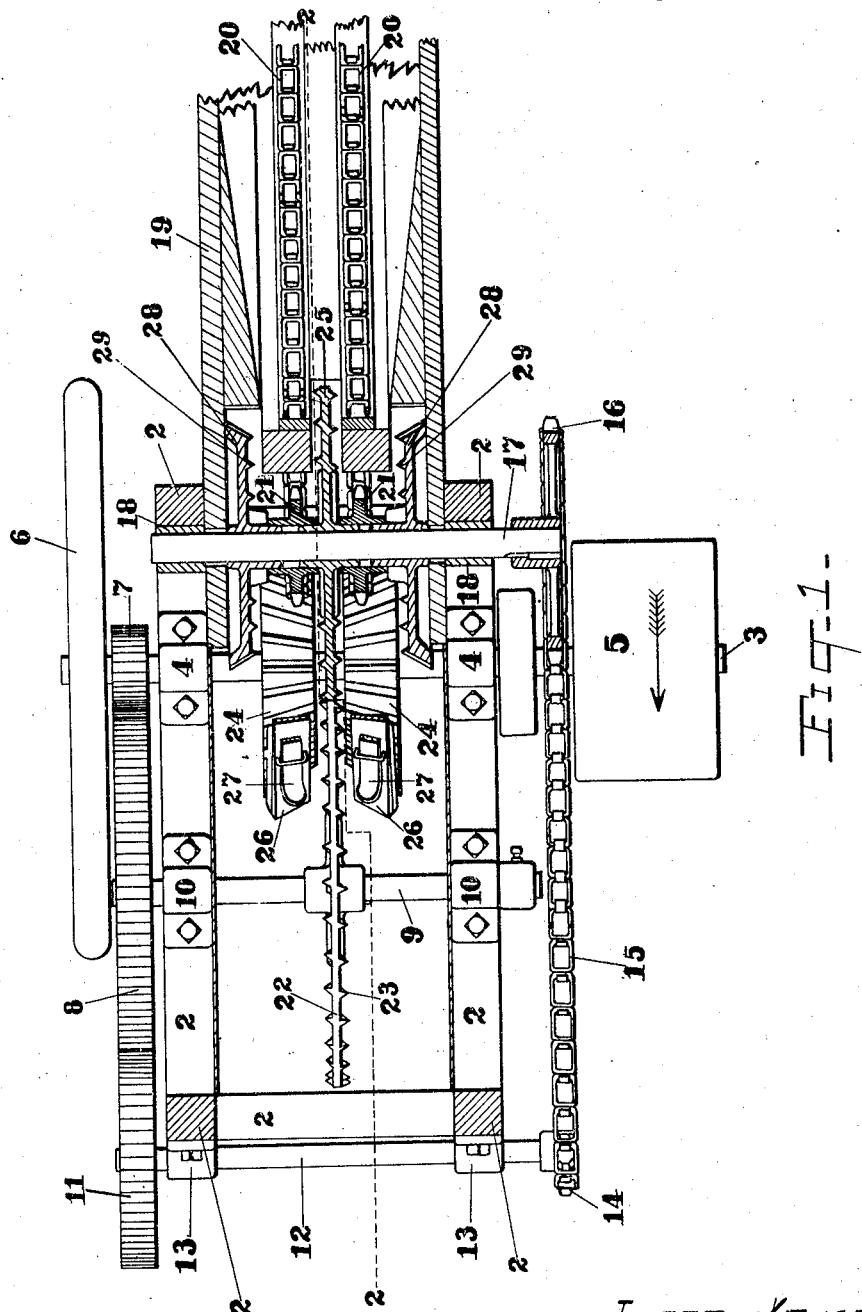
Figure 1 is a plan view in section on the line 1—1 of Fig. 2.

The casing inclosing the shelling mechanism is made, preferably of sheet metal sides 1 secured to a frame composed of vertical and longitudinal beams 2. A main shaft 3 is journaled in suitable bearings 4, secured on the frame, and extends beyond opposite sides of the machine. A pulley 5 is mounted on one end of the shaft 3 and on the opposite end is a fly wheel 6. Power to operate the mechanism is derived from a suitable source, and is transmitted to the pulley 5 by a belt, not shown, the pulley rotating in the direction indicated by the arrow.

Rigidly mounted on the shaft 3 is a pinion 7 meshing with a gear 8 on a shaft 9 journaled in bearings 10 on opposite sides of the casing. The gear 8 engages with a gear 11 on a shaft 12 journaled in bearings 13 on the end of the casing; on the opposite end of the shaft 12 is a sprocket 14 which transmits the power by means of a chain 15, to a sprocket 16 rigidly secured on a shaft 17 journaled in bearings 18 on the frame.

The corn to be shelled is dumped in a trough 19 having in the bottom thereof conveyer chains 20 which are actuated by sprockets 21 on the shaft 17 to carry the corn to the shelling devices, only sufficient of the trough and chains being shown as is necessary to illustrate the manner of feeding the corn to the sheller mechanism. A straight runner or disk 22 is rigidly mounted on the shaft 9 and is provided on its opposite faces with teeth 23 of the usual type and spaced apart, and operating, as the runner revolves, to turn the ears of corn as the grains are removed therefrom by shelling beveled wheels 24 actuated by the main shaft 3 on which they are rigidly mounted.

On the shaft 17 is a feed wheel 25, commonly used in this class of shellers and shown only in Fig. 1 in section, it operates similarly to the straight runner 22, that is between the shelling wheels 24. Rag irons 26 are secured to the top of the casing and extend downwardly through an opening in the top thereof to position between the shelling wheels 24 and the straight runner 22 forming spaces in which the shelling occurs; springs 27 are secured on the casing their lower ends engaging with the rag irons, so that the latter will exert a yielding pressure on the ears of corn of various sizes.

The mechanism heretofore described and its operation, is well known and my invention to increase its effectiveness and economy of operation consists of feeding wheels 28 which are rigidly mounted on the shaft 17; they are positioned on opposite sides of the casing adjacent the conveyer and the shelling wheels 24, and have their opposing faces provided with teeth 29 to assist in turning the ears to the shelling wheels. I am aware that feeding wheels have been used in the same position but they consist solely of flat circular disks having teeth similar to the teeth 29 and for the same purpose; I find, however, that by making the feeding wheels of a greater depth than the ordinary disk so that a wide bevel can be given to their peripheries toward the shelling wheels, and by making the beveled surface corrugated, a very decided advantage is attained, the corrugations being radial to the axis of the wheel 28, in that ears of corn dumped into the trough and carried to the shelling mechanism by the conveyer and feed wheels, the ears next to the sides of the trough are deflected toward the center of the machine by the bevel of the wheels 29, and consequently their progress toward the shelling mechanism is materially assisted, the corrugations tending to keep the mass of ears loose and in feedable condition, for as the corn is carried by the conveyer it is apt to bank with only the ordinary disk feeding wheel coöperating with the conveyer, frequently resulting in choking; these conditions are absent in my device, for the action of the beveled feeding wheels is not only to cause the corn to move away from the sides of the trough but coöperating with the conveyer the ears are more effectively straightened and at the same time are given a more or less rotary motion in their progress to the shelling mechanism.

The conveyer is generally kept full when the machine is in operation, and if a flat wheel or disk, having teeth on the side next the conveyer is employed to coöperate with the conveyer in delivering corn to the shelling mechanism, the corn is apt to crowd at the delivery end of the conveyer and to throw back or tumble in such a manner as to require a high rate of speed of the conveyer and wheels to insure a continuous feed to the shelling mechanism. These difficulties are overcome by the use of my peripherally beveled and corrugated wheel coöperating with the conveyer, and I have also found that by the use of a beveled corrugated wheel less power is required to operate the conveyer, for I am able to run it at a slow speed and accomplish better results than by operating at a high speed a conveyer having, in coöperation therewith, disks or wheels without a beveled corrugated periphery.

What I claim is—

1. A corn sheller, having in combination, a shelling mechanism and means to feed corn thereto, said means including a trough, a conveyer therein, and wheels on opposite sides of the conveyer having their peripheries beveled toward the conveyer and coöperating therewith to deliver corn to the shelling mechanism.

2. A corn sheller, having in combination, a shelling mechanism and means to feed corn thereto, said means including a trough, a conveyer therein, and wheels on opposite sides of the conveyer having their peripheries corrugated and beveled toward the conveyer and coöperating therewith to deliver corn to the shelling mechanism.

3. A corn sheller, having in combination, a shelling mechanism, and means to feed corn thereto, said means including a trough, a conveyer therein, and wheels on opposite sides of the conveyer having teeth on their inner faces and their peripheries beveled toward the conveyer and coöperating with the latter to deliver corn to the shelling mechanism.

4. A corn sheller, having in combination, a shelling mechanism, and means to feed corn thereto, said means including a trough, or conveyer therein, and wheels on opposite sides of the conveyer having teeth on their inner faces and having their peripheries corrugated and beveled toward the conveyer and coöperating with the latter to deliver corn to the shelling mechanism.

5. A corn sheller having in combination, a shelling mechanism and means to feed corn thereto, said means including a trough, a conveyer therein, and a vertically disposed circular rotatable element located adjacent the delivery end of the conveyer and having circumferential corrugations radial to its axis and adapted to coöperate with the conveyer to deliver corn to the shelling mechanism.

6. A corn sheller, having in combination a shelling mechanism, and means to feed corn thereto, said means including a trough, a conveyer therein, and a vertically disposed circular rotatable element located adjacent the delivery end of the conveyer and having circumferential corrugations inclined toward the conveyer, said element coöperating with the conveyer to deliver corn to the shelling mechanism.

In testimony whereof I affix my signature in presence of two witnesses.

THOMAS S. COURTNEY.

Witnesses:
B. J. KOUGH,
C. W. CLAUSER.